No. 746,074. PATENTED DEC. 8, 1903.
J. H. HALLBERG.
SYSTEM OF ELECTRICAL DISTRIBUTION.
APPLICATION FILED FEB. 20, 1903.
NO MODEL.
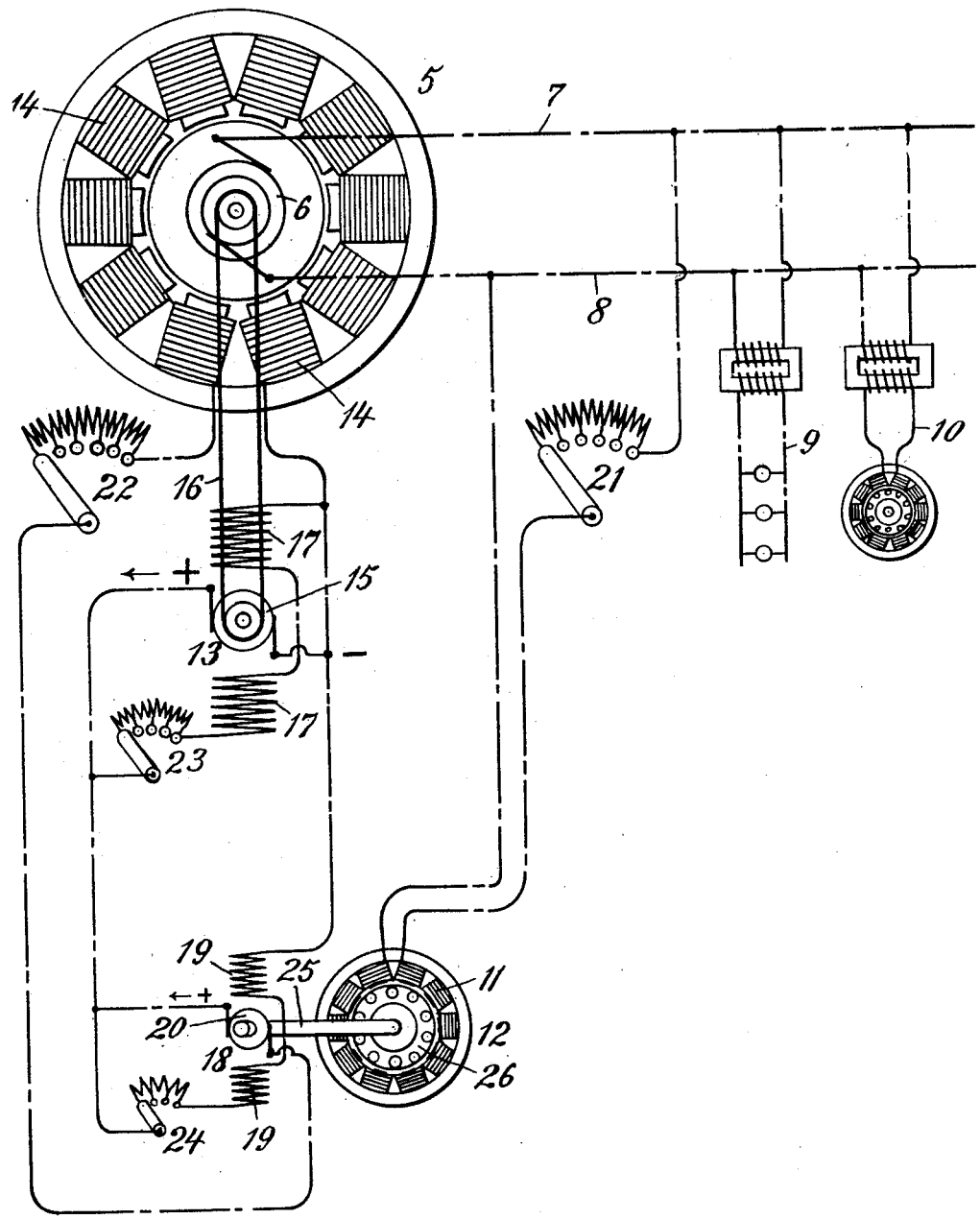
WITNESSES:
INVENTOR
J. H. Hallberg
BY
Geo. H. Benjamin
ATTORNEY No. 746,074. Patented December 8, 1903.

UNITED STATES PATENT OFFICE.

JOSEF HENRIK HALLBERG, OF NEW YORK, N. Y.

SYSTEM OF ELECTRICAL DISTRIBUTION.

SPECIFICATION forming part of Letters Patent No. 746,074, dated December 8, 1903.

Application filed February 20, 1903. Serial No. 144,276. (No model.)

*To all whom it may concern:*

Be it known that I, JOSEF HENRIK HALLBERG, a citizen of the United States, residing at New York city, county and State of New York, have invented a System of Electrical Distribution, of which the following is a specification.

My invention has especial reference to the automatic regulation of the current-generating devices used in systems of electrical distribution.

My improved system may be employed for distributing heat, light, and power.

Considered broadly, my invention may be said to consist in a system of electrical distribution wherein the current traversing and exciting the field-magnets of the main generator or main generators is automatically varied to maintain a uniform potential in the distributing-circuit by varying in accordance with the work in the distributing-circuit the speed of a small motor driving a small generator, the current from which is opposed to and acts to cut down the current of the generator, which furnishes the current to excite the field-magnets of the main generator or generators of the system.

The object of my invention is primarily to maintain the potential in the distributing-circuit constant, irrespective of the load in the circuit, and, secondarily, to do away with the complicated windings, resistances, and regulating devices heretofore used for such purpose, and generally to decrease the operating cost and increase the efficiency of the system.

The accompanying diagrams will serve to illustrate my invention.

The diagram illustrates an alternating system of distribution.

In the diagram, 5 indicates a main alternating-current generator, which is shown with its armature 6 connected across the conductors 7 8.

9 10 represent, respectively, light and power circuits.

Connected across the conductors 7 8 is the fixed member 11 of an alternating-current motor 12 of the type where the rotary member will have its speed increased or decreased as the current is increased or decreased in the fixed member.

13 indicates a shunt-wound direct-current dynamo connected across the field-magnets 14 of the generator 5. The armature 15 of this generator is adapted to be driven from the armature 6 of the generator 5 by means of a belt 16 or other suitable power-transmission device. The armature 15 will therefore have the same speed as the armature 6. The field-magnets 17 of the generator 13 are connected in shunt across the armature 15.

18 indicates a small generator having its field-magnets 19 in parallel with the field-magnets 17 of the generator 13 and therefore in shunt with the armature 15 of the generator 13. The armature 20 of the generator 18 is connected across the field-magnets 14 of the generator 5, and the direction of current from this armature is opposed to that from the generator 13, as is indicated by the plus, minus, and arrow marks on the drawing.

21 indicates a hand resistance in the circuit of the fixed member of the motor 12; 22, hand resistance in the circuit of the field-magnets 14 of the generator 5; 23, hand resistance in the field-magnets 17 of the generator 13; 24, hand resistance in the field-magnets 19 of the generator 18.

25 indicates a power-transmission means introduced between the rotary member 26 of the motor 12 and the armature 20 of the generator 18.

The operation of my device is as follows: The generator 13 is so designed that a given speed will deliver current in excess of that required to energize the magnets 14 of the generator 5 to create the required potential in the distributing-circuit, and the generator 18 is designed to generate current sufficient in quantity and direction to cut down the current from the generator 13 to that which is normally required to give the required potential. Assuming now the generator 18 and motor 12 to be driven at their normal speeds and the potential on the line to be that which is required, should a heavy load be thrown on the line the speed of the motor 12 will be reduced and correspondingly the speed of the generator 18. The generator 13, however, is run at a constant speed, and consequently as the current from this generator is now opposed by a current of less potential from generator 18 the current flowing from generator 13 to the field-magnets 14 of the generator 5 will be increased, with the effect that the potential of the line will be again restored to its normal amount. Upon a decrease in load the reverse conditions will apply.

The speed of the motor 12 can be adjusted through the hand resistance 21 and also the various resistances of the field-magnet circuits through the hand resistances 22 23 24.

Having thus described my invention, I claim—

1. A system of electrical distribution comprising a generator, a distributing-circuit, a motor having its fixed member connected across the distributing-circuit, a shunt-wound direct-current dynamo having its armature connected across the field-magnets of the generator, means interposed between the armature of the generator and the armature of the direct-current dynamo for rotating said last-named armature at a fixed speed, a small direct-current dynamo connected in opposition to the current from the first-named direct-current dynamo, and power-transmission means introduced between the armature of said second-named dynamo and the rotary member of said motor.

2. A system of electrical distribution, comprising a generator, a distributing-circuit, a motor having one of its members connected across the distributing-circuit, an exciting-generator for the field-magnets of the main generator, and a generator driven by the motor and delivering a current in opposition to that from the exciting-generator.

3. A system of electrical distribution comprising a generator, a distributing-circuit, a motor having its fixed member connected across the distributing-circuit, a small generator for exciting the field-magnets of the main generator, a second small generator connected in opposition to the first-named small generator, and means controlled by the speed of the motor for varying the current generated by said second-named small generator.

4. A system of electrical distribution comprising an alternating-current generator, a distributing-circuit, an alternating-current motor having its fixed member connected across the distributing-circuit, a direct-current exciter for the field-magnets of the generator, a direct-current machine connected in opposition to the direct-current exciter, and power-transmission means introduced between the rotary member of the motor and the armature of said second-named direct-current machine.

5. As a means for regulating the potential of a current in a distributing system, a motor having one of its members connected across the distributing-circuit, means for exciting the field-magnets of the generator delivering current into said system, and current-generating means delivering a current in opposition to that from the exciting means for the field-magnets of the generator controlled by the speed of rotation of one member of said motor, whereby the excitation of the field-magnets of the said generator will be automatically regulated.

6. As a means for regulating the potential of a current in a distributing system, a motor having its fixed member connected across the distributing-circuit and its rotary member connected to a current-generator arranged to deliver a current in opposition to the current exciting the fields of the main generator of the distribution system.

In testimony whereof I affix my signature in the presence of two witnesses.

JOSEF HENRIK HALLBERG.

Witnesses:
J. E. PEARSON,
FRANK O'CONNOR.